(12) United States Patent
Yoshikawa

(10) Patent No.: US 11,954,304 B2
(45) Date of Patent: Apr. 9, 2024

(54) INFORMATION PROCESSING DEVICE AND INFORMATION PROCESSING PROGRAM

(71) Applicant: FUJIFILM CORPORATION, Tokyo (JP)

(72) Inventor: Satoshi Yoshikawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/256,929

(22) PCT Filed: Jan. 17, 2022

(86) PCT No.: PCT/JP2022/001455
§ 371 (c)(1),
(2) Date: Jun. 12, 2023

(87) PCT Pub. No.: WO2022/158429
PCT Pub. Date: Jul. 28, 2022

(65) Prior Publication Data
US 2024/0036702 A1    Feb. 1, 2024

(30) Foreign Application Priority Data
Jan. 25, 2021   (JP) ................. 2021-009835

(51) Int. Cl.
G06F 3/01       (2006.01)
G06F 3/0482    (2013.01)
H04N 1/00      (2006.01)

(52) U.S. Cl.
CPC ....... *G06F 3/0482* (2013.01); *H04N 1/00413* (2013.01); *H04N 1/00474* (2013.01)

(58) Field of Classification Search
CPC ... G06F 3/0482; G06F 3/147; H04N 1/00413; H04N 1/00474; H04N 1/00411; H04N 1/00437; H04N 1/00501
See application file for complete search history.

(56) References Cited

U.S. PATENT DOCUMENTS

| | | | |
|---|---|---|---|
| 2005/0111866 A1 | 5/2005 | Sato | |
| 2013/0027736 A1* | 1/2013 | Kittaka | G06F 3/1257 358/1.14 |
| 2014/0198344 A1* | 7/2014 | Hirata | H04N 1/00413 358/1.15 |
| 2016/0224214 A1* | 8/2016 | Jarvis | G06F 3/0482 |
| 2021/0132885 A1* | 5/2021 | Okabayashi | G06F 3/1258 |

FOREIGN PATENT DOCUMENTS

JP    2005-297488 A    10/2005
JP    2014-013962 A    1/2014

* cited by examiner

*Primary Examiner* — Iriana Cruz
(74) *Attorney, Agent, or Firm* — SOLARIS Intellectual Property Group, PLLC

(57) ABSTRACT

When displaying a setting value selection screen for selecting a setting value of a setting item of a function associated with a selected menu button, an image forming device displays, for each setting list, a notification batch for notifying the presence or absence of a shortcut button associated with a setting list of the setting value selection screen.

13 Claims, 14 Drawing Sheets

FIG.7

| APP TYPE: COPY | | | | | |
|---|---|---|---|---|---|
| COLOR MODE: AUTO | | | | | |
| MANAGEMENT ID | DATE/TIME | NUMBER OF USE | NUMBER OF COPIES | PAPER SIZE | COMMON SETTING VALUE |
| 0001 | 2020/8/20 | 3 | 2 | B5 | COPY SIDE: BOTH SIDES MAGNIFICATION: 100% N-UP: NO |
| 0003 | 2020/8/25 | 2 | 2 | A4 | |
| 0006 | 2020/9/1 | 5 | 1 | A4 | |

FIG.8

| APP TYPE: COPY | | | | | | |
|---|---|---|---|---|---|---|
| COLOR MODE: AUTO | | | | | | |
| MANAGEMENT ID | DATE/TIME | NUMBER OF USE | NUMBER OF COPIES | PAPER SIZE | COMMON SETTING VALUE | |
| 0001 | 2020/8/20 | 3 | 2 | B5 | COPY SIDE: BOTH SIDES MAGNIFICATION: 100% N-UP: NO | |
| 0003 | 2020/8/25 | 2 | | | | |
| 0006 | 2020/9/1 | 5 | 1 | A4 | | |

FIG.9

| APP TYPE: COPY | | | | |
|---|---|---|---|---|
| PAPER SIZE: A4, COLOR MODE: AUTO | | | | |
| MANAGEMENT ID | DATE/TIME | NUMBER OF USE | NUMBER OF COPIES | COMMON SETTING VALUE |
| 0003 | 2020/8/25 | 2 | 2 | COPY SIDE: BOTH SIDES MAGNIFICATION: 100% N-UP: NO |
| 0006 | 2020/9/1 | 5 | 1 | |

FIG.11

| | SEARCH | | 31 |
|---|---|---|---|
| 33 → | USER A<br>192.168.1.1/ftp, a@xxx.yyy, 088-123-4567 | ④ | あ<br>か<br>さ |
| | USER B<br>b@xxx.yyy | ① | た<br>な<br>は |
| | USER C<br>c@xxx.yyy, 032-123-4567 | | ま<br>や<br>ら |
| | USER D<br>192.168.1.1/ftp, 040-123-4567 | ③ | わ<br>AZ# |
| | USER E<br>024-123-4567 | | |

APP TYPE: E-MAIL ~34

| MANAGEMENT ID | DATE/TIME | NUMBER OF USE | FILE FORMAT | COMMON SETTING VALUE |
|---|---|---|---|---|
| 0004 | 2020/8/30 | 2 | doc | RESOLUTION: 200 dpi |
| 0007 | 2020/9/1 | 3 | pdf | MAGNIFICATION: 100% |

APP TYPE: FACSIMILE ~34

| MANAGEMENT ID | DATE/TIME | NUMBER OF USE | COMMUNICATION FORMAT |
|---|---|---|---|
| 0002 | 2020/8/20 | 5 | G3 |

FTP APP TYPE: FTP ~34

| MANAGEMENT ID | DATE/TIME | NUMBER OF USE |
|---|---|---|
| 0008 | 2020/9/20 | 1 |

FIG.14

| APP TYPE: E-MAIL | | | | | | |
|---|---|---|---|---|---|---|
| MANAGEMENT ID | DATE/TIME | NUMBER OF USE | FILE FORMAT | MAIL ADDRESS BEFORE CHANGE | USE CURRENT MAIL ADDRESS | COMMON SETTING VALUE |
| 0004 | 2020/8/30 | 2 | doc | aaa@xxx.yyy | ☐ | RESOLUTION: 200 dpi MAGNIFICATION: 100% |
| 0007 | 2020/9/1 | 3 | pdf | — | — | |

INFORMATION PROCESSING DEVICE AND INFORMATION PROCESSING PROGRAM

TECHNICAL FIELD

The technology of the present disclosure relates to an information processing device and an information processing program.

BACKGROUND ART

Japanese Patent Application Laid-Open (JP-A) No. 2005-297488 discloses an image forming device having an input means for inputting a operation command, and a display means for providing information display and the input means. This image forming device has: a operation history storage means for storing a operation history based on the operation command input by the input means; a communication means for performing data communication with another or other image forming devices communicable via a predetermined network; a operation history collection means for collecting a operation history from another or other image forming devices by using the communication means; a operation history integration means for integrating the operation history stored by the operation history storage means and the operation history collected from another or other image forming devices by the operation history collection means; a operation history display means for controlling display of the operation history integrated by the operation history integration means on the display means; a operation history selection means for selecting any operation history from among the operation histories displayed on the display means; and a setting means for setting the image forming device based on the operation history selected by the operation history selection means.

JP-A No. 2014-13962 discloses an image forming device including: a storage means for storing a history of job settings set in the past; a search means for creating a list of job settings searched in accordance with a predetermined condition from the history of the job settings stored in the storage means; a display means for displaying the list; a setting means for setting, as a current job setting, a job setting selected from the list in accordance with an instruction by a user; and an execution means for executing a job in accordance with the job setting set by the setting means.

SUMMARY OF INVENTION

Technical Problem

A configuration is known such that setting information, in which a setting value for each setting item set in the past is stored, is kept, and when a setting value same as the kept setting information is used, executing a function without re-inputting the setting value of each setting item by selecting an operation element associated with the stored setting information.

In such operation, as the number of pieces of kept setting information increases, it becomes difficult for a user to find desired setting information from the plural pieces of setting information. Therefore, after the user sets a setting value for any setting item, the kept setting information may be narrowed down (refined) to pieces of setting information including the setting value set by the user, and presented to the user.

However, since the setting information is not narrowed down until the user sets any setting value for the setting item, if the user does not remember the setting value set in the past for the setting item, desired setting information used in the past is not presented, and it becomes difficult for the user to select desired setting information from the kept setting information.

An object of the technology of the disclosure is to provide an information processing device and an information processing program capable of, even if a user does not select a setting value of a setting item, narrowing down plural pieces of setting information storing a setting value for each setting item set in the past to setting information including each setting value selectable for the setting item and displaying the narrowed down setting information.

Solution to Problem

An information processing device according to a first aspect includes a processor that is configured to: display, on a display device, a first operation element for allowing a user to select a function to be executed, and a setting screen including each setting item that defines an operation of the function associated with the first operation element selected by the user, and display, for each setting list and in association with the setting list, information indicating that a second operation element including each possible setting value of the setting item, associated with each setting list displayed in a case in which any setting item included in the setting screen is selected, exists among second operation elements associated with setting information in which a setting value of each setting item set through the setting screen is stored for each setting item, the second operation element executing a function in accordance with the associated setting information when the operation element is selected.

The information processing device according to a second aspect is the first aspect, in which the processor is configured to display, for each setting list and in association with the setting list, a number of the second operation elements including each possible setting value of the setting item, as the information indicating that the second operation element including each possible setting value of the setting item exist.

The information processing device according to a third aspect, is the first or second aspect in which the processor is configured to further associate only the second operation element that meets a predetermined condition with the setting list among the second operation elements including the setting value associated with the setting list, and displays, for each setting list, information indicating that the second operation element associated with the setting list exists.

The information processing device according to a fourth aspect is the third aspect in which the processor is configured to associate, with the setting list, the second operation element associated with the setting information set by the user who intends to execute the function associated with the first operation element, among the second operation elements including the setting value associated with the setting list.

The information processing device according to a fifth aspect, is the third aspect in which the processor is configured to associate, with the setting list, the second operation element associated with the setting information including all setting values of the setting items other than the setting item selected from the setting screen by the user, set for the function associated with the first operation element to be executed by the user, among the second operation elements including the setting values associated with the setting list.

The information processing device according to a sixth aspect, is the third aspect in which the processor is configured to associate, with the setting list, the second operation element associated with the setting information including all setting values of which settings have been changed from initial values set in advance for the respective setting items in the function associated with the first operation element to be executed by the user, among the second operators including the setting values associated with the setting list.

The information processing device according to a seventh aspect is any one of the first to sixth aspects, in which the processor is configured to, in a case in which a display region showing the information indicating that the second operation element displayed in association with the setting list exists, is selected, display each of the second operation elements associated with the setting list together with the setting information associated with each of the second operation elements.

The information processing device according to an eighth aspect is the seventh aspect, in which the processor is configured to collectively display the setting values of the setting items common to respective pieces of the setting information of the second operation elements, among the setting information displayed together with the second operation elements, as setting values common to the second operation elements, and individually display the setting values of the setting items different for two or more of the second operation elements for each of the second operation elements.

The information processing device according to a ninth aspect is any one of the first to eighth aspects, in which the second operation elements is at least one of a history operation element associated with the setting information when an instruction from a user to execute the function associated with the first operation element is accepted, or a save operation element created as the setting information repeatedly used by the user.

The information processing device according to a tenth aspect is any one of the first to ninth aspects, in which the processor is configured to, in a case in which the function selected by the first operation element includes a plurality of types of transmission functions for transmitting information through a communication line, accept an address book display instruction for displaying a list of addresses associated with at least one transmission destination identifier used in any of the transmission functions, and display, for each address in the address book, information indicating that the second operation element associated with the setting information including, as a setting value, a transmission destination identifier associated with the address exists in association with the address.

The information processing device according to an eleventh aspect is the tenth aspect, in which the processor is configured to, in a case in which a display region showing information indicating that the second operation element displayed in association with the address exists, is selected, display each of the second operation elements associated with the address together with the setting information associated with each of the second operation elements The information processing device according to a twelfth aspect is the eleventh aspect, in which the processor is configured to collectively display the second operation elements for each type of the transmission function.

The information processing device according to a thirteenth aspect is the eleventh or twelfth aspect, in which the processor is configured to, in a case in which the transmission destination identifier included in the setting information is a transmission destination identifier previously associated with the address, display, together with the setting information, notification information notifying that the transmission destination identifier has been changed.

The information processing device according to a fourteenth is the thirteenth aspect, in which the processor is configured to display, together with the setting information, an option for selecting which transmission destination identifier is used to execute the transmission function associated with the second operation element.

An information processing program according to a fifteenth aspect causes a computer to execute a processing including: displaying, on a display device, a first operation element for allowing a user to select a function to be executed, and a setting screen including each setting item that defines an operation of a function associated with the first operation element selected by the user, and display, for each setting list and in association with the setting list, information indicating that a second operation element including each possible setting value of the setting item, associated with each setting list displayed in a case in which any setting item included in the setting screen is selected, exists among second operation elements associated with setting information in which a setting value of the setting item set through the setting screen is stored for each setting item, the second operation elements executing a function in accordance with the associated setting information when the operation element is selected.

Effects of Invention

According to the first aspect and the fifteenth aspect, effects are exerted such that even if the user does not select a setting value of a setting item, plural pieces of setting information storing a setting value for each setting item set in the past may be narrowed down to setting information including each setting value selectable for the setting item and the narrowed down setting information is displayed.

According to the second aspect, effects are exerted such that even if the user does not select the setting value of the setting item, the number of second operation elements associated with the setting information including the setting value may be displayed for each setting value of the setting item.

According to the third aspect, effects are exerted such that the user may more easily find a desired second operation element than a case where the second operation element displayed in association with the setting list is all of the second operation elements associated with the setting information including the setting values of the setting list.

According to the fourth aspect, effects are exerted such that a second operation element associated with the setting information set by another user may be prevented from being displayed in association with the setting list.

According to the fifth aspect, effects are exerted such that only the second operation elements associated with the setting information including all of the setting values of the setting items other than the setting item selected from the setting screen by the user may be associated with the setting list.

According to the sixth aspect, effects are exerted such that only the second operation element associated with the setting information including a setting value of the setting item intentionally set by the user may be associated with the setting list.

According to the seventh aspect, effects are exerted such that a function may be executed in accordance with the desired setting information including the setting value associated with the setting list in which the selected display region exists without shifting to the setting screen.

According to the eighth aspect, effects are exerted such that the difference in the setting information associated with each of the second operation elements is displayed in an easy-to-understand manner as compared with a case where the respective setting values included in the setting information associated with the second operation elements are listed and displayed on the second operation element.

According to the ninth aspect, effects are exerted such that not only the second operation element associated with the executed setting information but also the second operation element associated with the setting information that has not been executed by the user may be associated with the setting list.

According to the tenth aspect, effects are exerted such that the presence or absence of the second operation element associated with the setting information including the desired destination may be confirmed from the address book.

According to the eleventh aspect, effects are exerted such that a transmission function may be executed in accordance with the desired setting information including the address associated with the selected display region without shifting to the setting screen.

According to the twelfth aspect, effects are exerted such that the user may more easily search for the second operation element that executes the desired type of transmission function than a case where the second operation elements are displayed in a mixed manner regardless of the type of transmission function.

According to the thirteenth aspect, effects are exerted such that attention may be attracted so that the user does not transmit data to a wrong transmission destination.

According to the fourteenth aspect, effects are exerted such that even if the transmission destination identifier included in the setting information is an transmission destination identifier not used anymore, the transmission function in accordance with the setting information may be executed while the transmission destination identifier is set to a correct value.

BRIEF DESCRIPTION OF DRAWINGS

FIG. 7 shows a display example of a setting information list.

FIG. 8 shows another display example of a setting information list.

FIG. 9 shows a display example of a setting information list in which shortcut buttons to be displayed are narrowed down by using a setting value changed from an initial value by a user.

FIG. 11 shows an example of an address book.

FIG. 13 shows an example of a setting information list for transmission function.

FIG. 14 shows a display example of a shortcut button including notification information.

DESCRIPTION OF EMBODIMENTS

Hereinafter, the present embodiment will be described with reference to the drawings. Note that the same components and the same processing are denoted by the same reference signs throughout the drawings, and redundant description will be omitted.

First Embodiment

Figure 1:
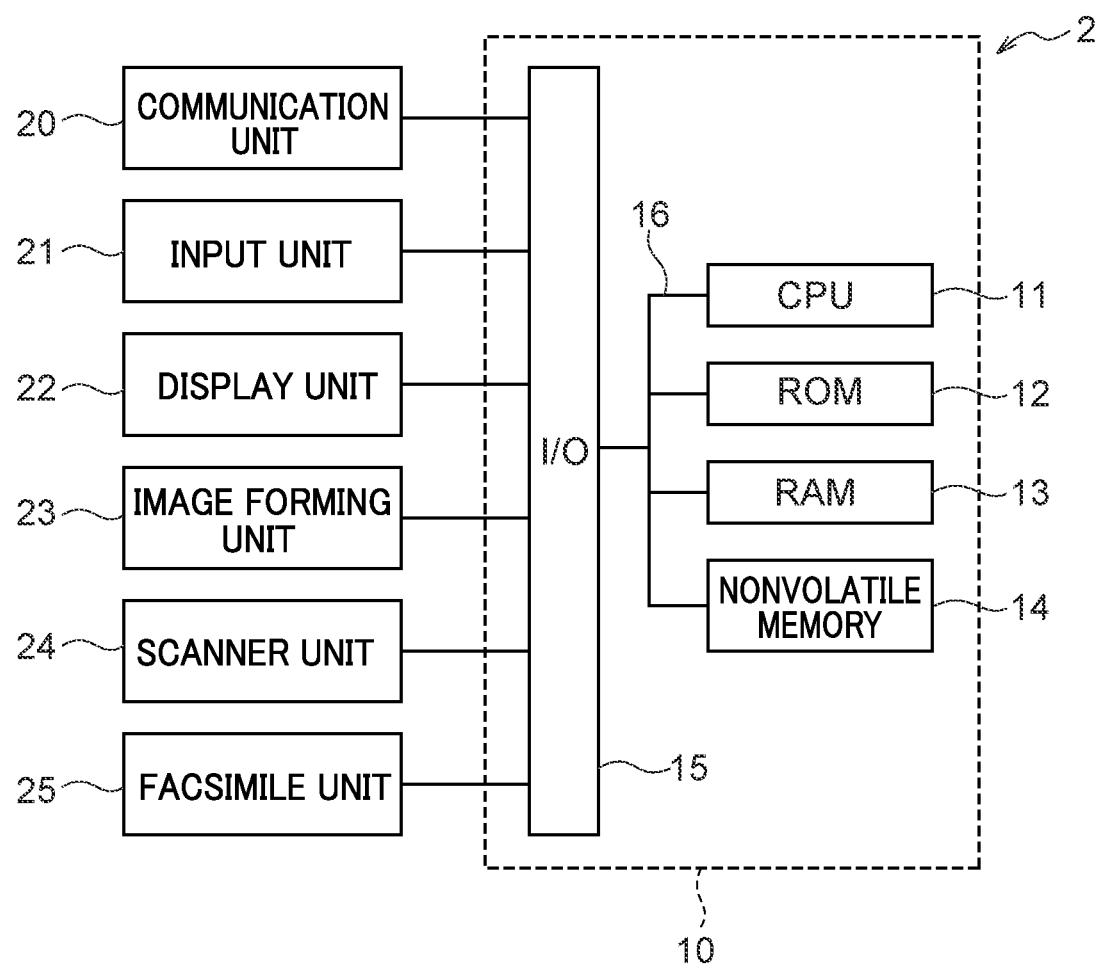
FIG. 1 shows an exemplary configuration of a main part of an information processing device.

FIG. 1 shows an exemplary configuration of a main part of an information processing device. The information processing device according to the present embodiment is a device that executes a selected function in accordance with setting information set for each setting item by a user. There is no limitation to the type of the information processing device as long as the information processing device is a device that displays, on a screen, an operation element that accepts a operation from a user and starts execution of a function, and any type of information processing device may be used.

Herein, the "setting item" is an item that defines an operation of a function, and "setting information" is information in which a setting value set for each setting item is stored for each setting item in association with the setting item. There is no imitation to the content of the setting value, and for example, numerical values, characters, symbols, figures, and images may be used. Moreover, "operation element" is an operation target by the user and is a user interface in which the information processing device accepts an operation of a user.

Hereinafter, as an example of an information processing device, an embodiment of an information processing device will be described using an image forming device 2 having at least one of plural functions such as an image forming function of forming contents of a specified file on a recording medium, a scanner function of optically reading contents described on a document, a copy function of forming contents of a read document on a recording medium as an image, a facsimile function of transmitting and receiving image data via a public line and forming received image data on a recording medium as an image, a mail function of transmitting received data by e-mail, or a file transfer protocol (FTP) function of transmitting received data by FTP. As a matter of course, the information processing device may be an information apparatus such as a smartphone, a tablet terminal, a wearable device, or a desktop computer.

The image forming device 2 is configured by using, for example, a computer 10. The computer 10 includes a central processing unit (CPU) 11 that is an example of a processor responsible for executing functions, a read only memory (ROM) 12 that stores an information processing program causing the computer 10 to function as the image forming device 2, a random access memory (RAM) 13 used as a temporary work region of the CPU 11, a nonvolatile memory 14, and an input/output interface (I/O) 15. The CPU 11, the ROM 12, the RAM 13, the nonvolatile memory 14, and the I/O 15 are connected via a bus 16.

The nonvolatile memory 14 is an example of a storage device in which stored information is maintained even when power supplied to the nonvolatile memory 14 is cut off. For example, a semiconductor memory is used for the nonvolatile memory 14, but a hard disk may also be used. Information that needs to be kept stored even when the power supply of the image forming device 2 is cut off, such as setting information of functions, is stored in the nonvolatile memory 14.

Note that the nonvolatile memory 14 is not necessarily built in the computer 10, and may be, for example, a portable storage device detachable from the computer 10.

For example, a communication unit 20, an input unit 21, a display unit 22, an image forming unit 23, a scanner unit 24, and a facsimile unit 25 are connected to the I/O 15.

The communication unit 20 is connected to a communication line (not shown) and includes a communication protocol for transmitting and receiving data to and from an external device connected to the communication line (not shown). The e-mail function and the FTP function in the image forming device 2 transmit and receive data via the communication unit 20.

The input unit 21 is a device that accepts a user's instruction and notifies it to the CPU 11, and includes, for example, a button, a touch panel, a mouse, a keyboard, and a pointing device. The image forming device 2 according to the present embodiment includes at least a touch panel as an input unit.

The display unit 22 is an example of a display device that displays information processed by the CPU 11 as an image, and includes, for example, a liquid crystal display or an organic electro luminescence (EL) display. Note that a touch panel, which is an example of the input unit 21, is attached to the display unit 22 in a superimposed manner, and when an operation element displayed at a place where the touch panel is pressed is operated by a user, an instruction associated with the operated operation element is notified to the CPU 11. Note that pressing an operation element through the touch panel or operating of an operation element by clicking a button of a mouse is referred to as "selecting" the operation element.

The image forming unit 23 is a unit that forms an received image on a recording medium in accordance with an instruction from the CPU 11. The image forming method in the image forming unit 23 may be any method, for example, any of an electrophotographic method, an inkjet method, or an offset printing method. The image forming unit 23 is used in association with execution of an image forming function, a copy function, and a facsimile function.

The scanner unit 24 is a unit that optically reads, for example, a content of a document placed on a platen glass (not shown) in accordance with an instruction of the CPU 11 and converts the read content of the document into image data. The scanner unit 24 is used in association with execution of a scanner function, a copy function, and a facsimile function.

The facsimile unit 25 is a unit that transmits image data obtained by the scanner unit 24 to another facsimile device via a public line (not shown) as well as receives image data from another facsimile device via a public line (not shown). The CPU 11 causes the image forming unit 23 to form an image of image data received from a public line (not shown) on a recording medium. Conventionally, facsimiles are also referred to as "faxes".

The copy function is realized by causing the CPU 11 to form image data obtained by the scanner unit 24 on the recording medium by the image forming unit 23.

Figure 2:
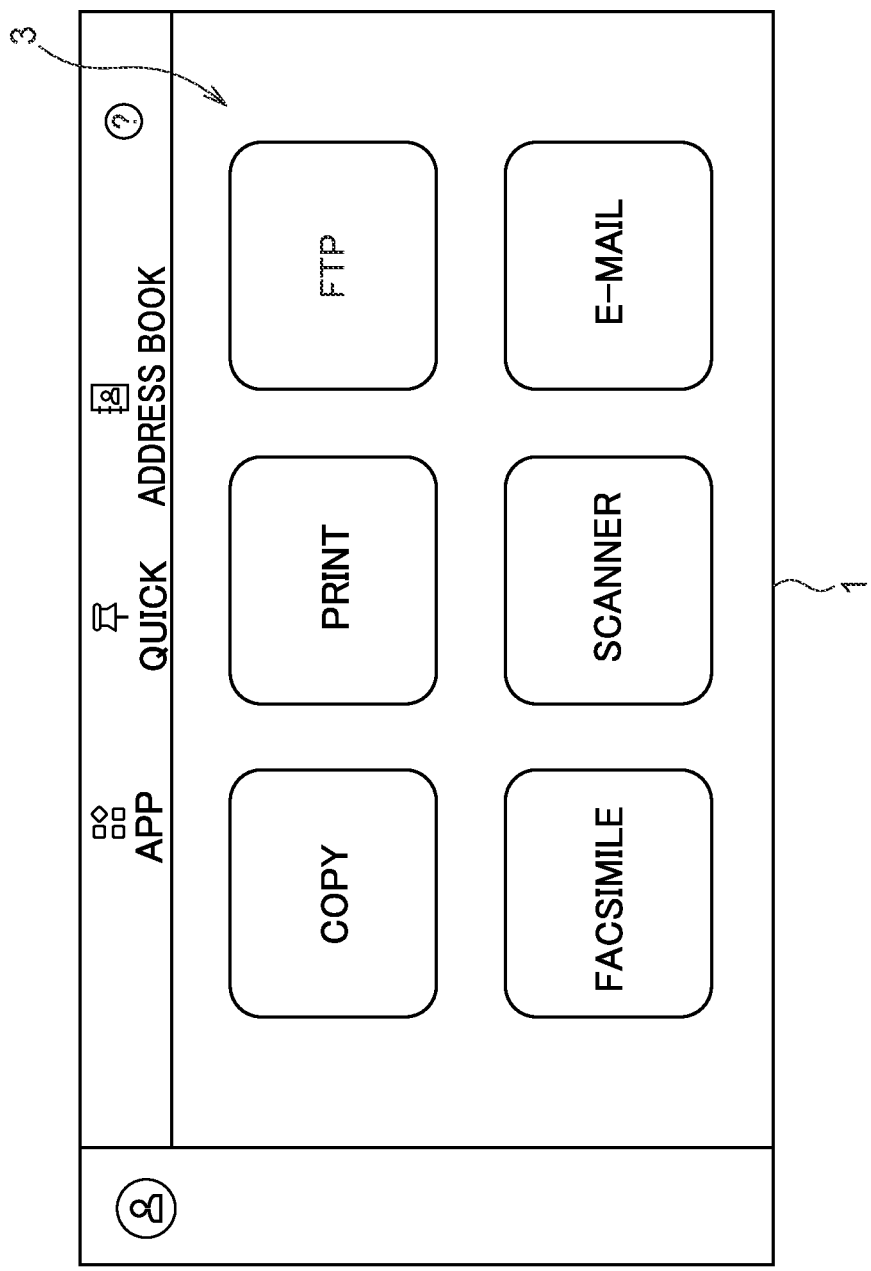
FIG. 2 shows an example of a menu screen.

FIG. 2 shows an example of a menu screen 1 displayed on the display unit 22 of the image forming device 2. The menu screen 1 is an example of an initial screen first displayed on the display unit 22 when the power of the image forming device 2 is turned on.

The menu screen 1 displays a menu button 3 which is an example of a first operation element allowing a user to select a function to be executed. The menu button 3 includes a copy button for executing a copy function, a print button for executing an image forming function, a facsimile button for executing a facsimile function, a scanner button for executing a scanner function, an FTP button for executing an FTP function, and an e-mail button for executing a mail function.

After a user selects the menu button 3 corresponding to any function, a setting value list screen 4 of the function associated with the selected menu button 3 is displayed on the display unit 22. The setting value list screen 4 is an example of a setting screen including each setting item that defines the operation of the function.

Figure 3:
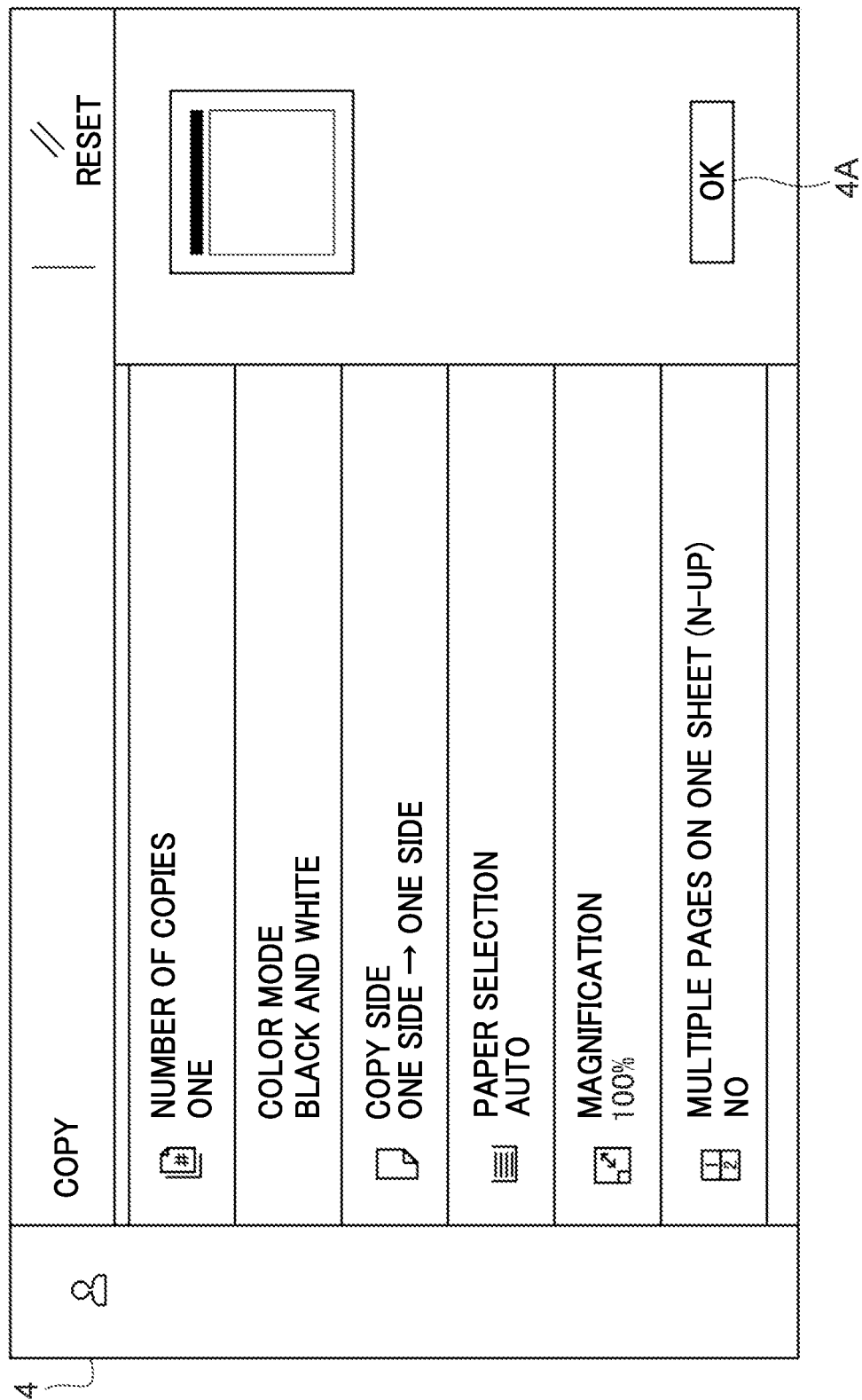
FIG. 3 shows an example of a setting value list screen.

FIG. 3 shows an example of a setting value list screen 4 displayed in a case where a user selects a copy button from the menu button 3, for example.

The setting value list screen 4 is a screen that displays a current setting value set for each of the setting items prepared in advance for the function. In a case in which all of the setting items cannot be displayed within the display range of the setting value list screen 4, a user may scroll the setting value list screen 4 to display all the setting items.

The setting items related to the copy function include, for example, a number of copies, a color mode for designating a color of a copied image, a copy side for designating a surface of a recording medium to be copied, paper selection for selecting paper to be copied, a magnification for setting a ratio of enlargement and reduction of copy, and an N-up for designating the number of pages to be collectively copied in one page.

For each setting item, an initial value predetermined by the image forming device 2 is set as a setting value. Through the setting value list screen 4, a user changes the setting value in the setting item that needs to be changed from the initial value to a desired value in order to execute copying in accordance with the user's own desire. Note that, as the initial value, a setting value set in advance at the time of factory shipment by the manufacturer of the image forming device 2 is used. However, the user may change the initial value by operating the input unit 21. Moreover, the image forming device 2 may set a setting value for each setting item set immediately before as the initial value of the setting item.

After a user selects the execution button 4A and performs an execution operation of the copy function, the image forming device 2 executes copying in accordance with the setting value set for each of the setting items of the copy function. Each time the function is executed, the image forming device 2 generates setting information in which, for example, a management ID for managing the setting information, a date and time when the function is executed, a user ID for identifying a user who has executed the function, a cumulative number of executions of the setting information represented by the management ID, and a setting value of each of the setting items are stored in association with the setting item, and stores the generated setting information in the nonvolatile memory 14.

Herein, generation of the setting value list screen 4 and the setting information in a case where the copy function is selected has been described as an example. However, even in a case where a function other than the copy function is selected by a user, the image forming device 2 displays the setting value list screen 4 corresponding to each selected function on the display unit 22, and accepts setting of the setting value for each of the setting items. Moreover, even in a case where a function other than the copy function is selected by a user, the image forming device 2 generates setting information each time the function is executed, and stores the generated setting information in the nonvolatile memory 14.

Figure 4:
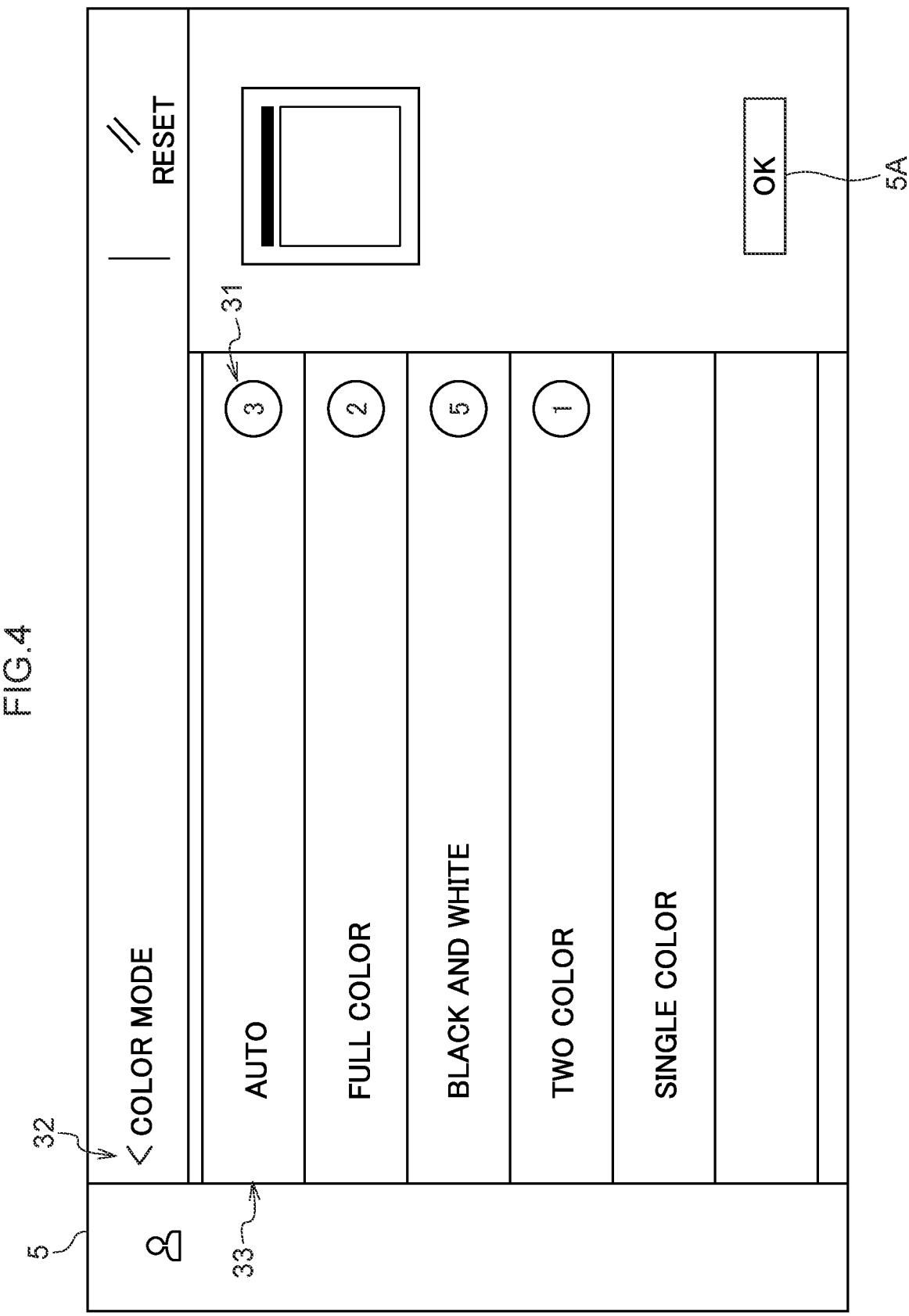
FIG. 4 shows an example of a setting value selection screen.

FIG. 4 shows an example of a setting value selection screen 5 displayed on the display unit 22, for example, in a case where a user selects the setting item of a color mode on the setting value list screen 4 of the copy function.

On the setting value selection screen 5, for the setting item selected on the setting value list screen 4, all setting values that is possible to be taken by the setting item are displayed in a setting list 33 separately for each setting value. The setting value displayed in each items of the setting list 33 is an example of the setting value associated with the setting list 33. In a case where all items of the setting list 33 cannot be displayed within the display range of the setting value selection screen 5, a user may scroll the setting list 33 to display all items of the setting list 33.

In the example of the setting value selection screen 5 shown in FIG. 4, the setting values of "auto", "full color", "black and white", "two color", and "single color" for the color mode are displayed in the setting list 33.

In a case where a user desires to set the color mode to "auto", the user selects the setting list 33 in which "auto" is displayed. When executing the copy function with the setting value set, the user selects the execution button 5A. Moreover, in order to return to the setting value list screen 4, the user selects, for example, a return button 32 represented by "<".

Note that a notification batch 31 may be displayed in the setting list 33 associated with each setting value.

The notification batch 31 is an example of information notifying that setting information including the setting values displayed in the setting list 33 exists among all the setting information stored in the nonvolatile memory 14, for example. That is, in a case where setting information including the setting value associated with the setting list 33 is stored in the nonvolatile memory 14, the notification batch 31 is displayed in the setting list 33 that displays that setting value, and in a case where setting information including the setting value associated with the setting list 33 is not stored in the nonvolatile memory 14, the notification batch 31 is not displayed in the setting list 33 that displays that setting value.

Note that, since the setting information is associated one-to-one with a shortcut button 8 to be described later, the notification batch 31 is also an example of information notifying that a shortcut button 8 including the setting value displayed in the setting list 33 exists among the shortcut buttons 8 associated with each setting information.

Here, the shortcut button 8 associated with the setting information will be described.

Figure 5:
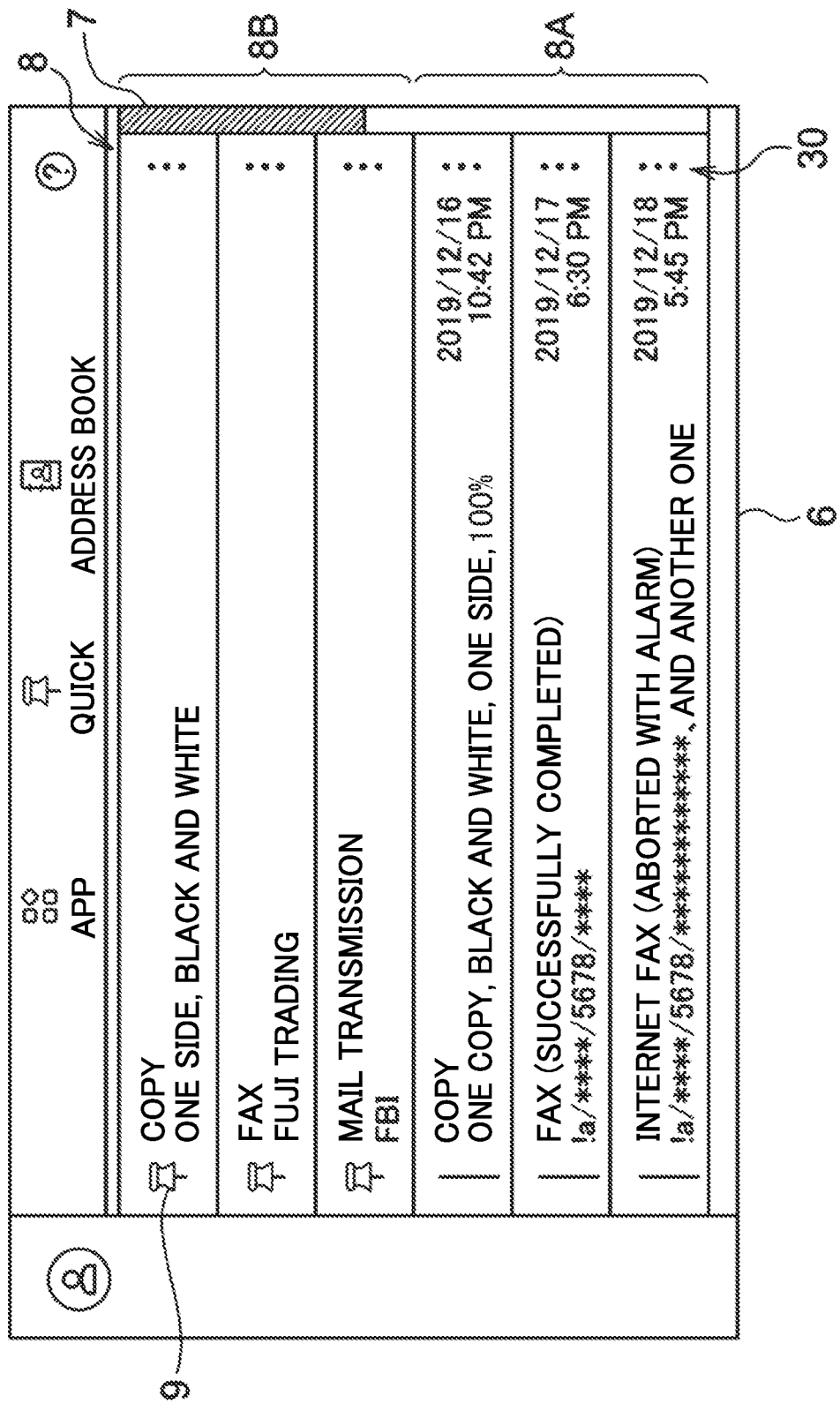
FIG. 5 shows an example of a history screen.

FIG. 5 shows an example of a history screen 6 that displays the setting information stored in the nonvolatile memory 14. FIG. 5 is displayed, for example, when a user presses a "quick" button displayed on the upper side of the menu screen 1 shown in FIG. 2. In the example of the history screen 6 shown in FIG. 5, since plural executed functions are arranged and displayed in time series, setting information for different functions is displayed in a mixed manner in the same screen. However, only the setting information of the function designated by the user may be arranged and displayed in time series on the history screen 6. Note that, after "APP" button displayed on the upper side of FIG. 5 is pressed, the menu screen 1 shown in FIG. 2 is displayed.

The history screen 6 displays a history button 8A associated with each piece of setting information and a save button 8B, which is a history button 8A pinned by a user. In a case where all of the history buttons 8A and the save buttons 8B cannot be displayed within the display range of the history screen 6, all of the history buttons 8A and the save buttons 8B are displayed by scrolling the history screen 6 with a scroll bar 7.

After any history button 8A or save button 8B is selected by a user, the image forming device 2 sets a setting value included in the setting information of the function associated with the selected history button 8A or save button 8B to each setting item, and then executes the function associated with the selected history button 8A or save button 8B.

That is, by selecting the history button 8A or the save button 8B, the user can execute the same function in accordance with the same setting information as the setting information previously set by the user, without setting the setting value for each setting item on the setting value list screen 4. In this case, the image forming device 2 may execute the function without transitioning to the setting value list screen 4 shown in FIG. 3 after the history button 8A or the save button 8B is selected, or may once transition to the setting value list screen 4 after the history button 8A or the save button 8B is selected and execute the function when the execution button 4A of the setting value list screen 4 is selected by the user.

Since there is an upper limit to the number of the history buttons 8A displayed on the history screen 6, the setting information stored in the nonvolatile memory 14 increases as the functions being executed in the image forming device 2. When the number of history buttons 8A associated with the setting information reaches the upper limit, the history buttons 8A associated with the older setting information may disappear from the history screen 6 in sequence. In a case in which the history button 8A associated with the setting information having a higher use frequency than the other setting information disappears from the history screen 6, a user needs to set again the same setting information as the setting information associated with the history button 8A that the user intends to select from the setting value list screen 4, which is troublesome.

Therefore, the image forming device 2 constantly displays the history button 8A designated by the user on the history screen 6 regardless of the number of pieces of setting information stored in the nonvolatile memory 14. Such an operation for preventing the operation element for executing the function associated with the preset setting information from being deleted is referred to as "pinning".

For example, pinning of the history button 8A is performed in a setting menu that is displayed when a menu icon 30 provided for each history button 8A is selected. After the pinning is performed, for example, as shown in FIG. 5 as the save button 8B on the history screen 6, a save icon 9 having a pin shape is displayed on the save button 8B.

Conversely, the pinning may be released from the setting menu displayed when the menu icon 30 of the save button 8B is selected. The save button 8B whose pinning has been released operates as the history button 8A. The save button 8B whose pinning has been released may be arranged, as the history button 8A, in time series on the history screen 6 based on the execution time similarly to the other history buttons 8A, or may be displayed above the other history buttons 8A by being arranged in time series on the history screen 6 based on the released time. Alternatively, the save button 8B whose pinning has been released may not be displayed as the history button 8A.

Note that the image forming device 2 also accepts the user's pinning operation from a screen other than the history screen 6. For example, the user may pin the setting information set from the setting value list screen 4 shown in FIG. 3. That is, not only the setting information for the executed function but also the setting information for the function to be executed from now may be pinned. In a case where the user performs pinning on the setting value list screen 4, a combination of the function selected on the menu screen 1 and the pinned setting information is displayed on, for example, the history screen 6.

The history button 8A and the save button 8B that execute a function associated with the menu button 3 are operation elements associated with the setting information in which a setting value of each setting item set through the setting screen is stored for each setting item, and are an example of a second operation element that executes a function according to the associated setting information in a case where the operation element is selected.

Furthermore, the history button 8A associated with the history of the setting information set when the function selected by the menu button 3 is executed is an example of a history operation element, and the save button 8B associated with the setting information repeatedly used by a user is an example of a save operation element.

Hereinafter, in a case where it is not necessary to separately describe the history button 8A and the save button 8B, these are referred to as "shortcut buttons 8" since both the history button 8A and the save button 8B are buttons that execute associated functions without setting the setting information again for each setting item. That is, the shortcut button 8 is an example of a second operation element that executes the function associated with the first operation element in accordance with the setting information associated with the shortcut button 8.

In order for a user to easily confirm the setting information associated with the shortcut button 8, the image forming device 2 displays the associated setting information in association with the shortcut button 8 on the history screen 6. For example, in the case of the history button 8A associated with the setting information of the copy function in which the number of copies is set to one, the color mode is set to black and white, the copy face is set to one side, and the magnification of copy is set to 100%, the image forming device 2 displays the setting information such as "one copy, black and white, one side, 100%" as illustrated in FIG. 5. Note that the image forming device 2 may display, for the save button 8B, a title set by the user to indicate what kind of setting information is associated with the save button 8B, for example, "one side, black and white".

When the shortcut button 8 is selected by the user, the image forming device 2 stores a cumulative number of times of execution of the function executed in accordance with the setting information associated with the selected shortcut button 8 for each setting information, and includes the stored cumulative number of times of execution in the setting information as a "number of times of use".

Next, display processing that performs, when a user selects a specific setting item from the setting value list screen 4 shown in FIG. 3, display of the setting value selection screen 5 shown in FIG. 4 corresponding to the selected setting item, will be described.

Figure 6:
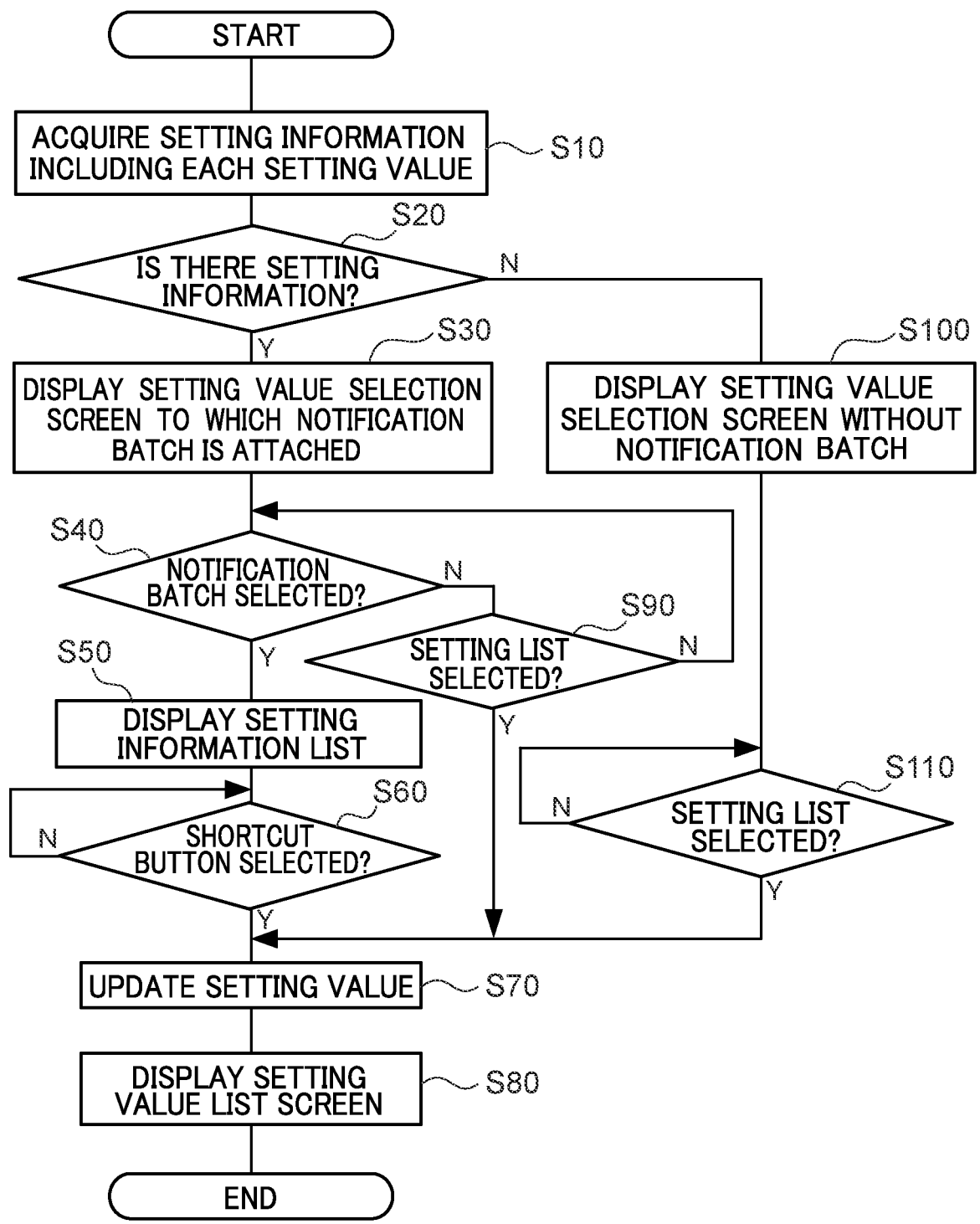
FIG. 6 is a flowchart showing an example of display processing of the setting value selection screen.

FIG. 6 is a flowchart showing an example of the display processing executed by the CPU 11 of the image forming device 2, for example, in a case where the setting value selection screen 5 is displayed on the display unit 22.

The information processing program that defines the display processing of the setting value selection screen 5 is stored in advance in the ROM 12 of the image forming device 2, for example. The CPU 11 of the image forming device 2 reads an information processing program stored in the ROM 12 and executes the display processing of the setting value selection screen 5.

Note that the setting information may be stored in an external device such as a cloud server. However, herein, as an example, the description will be given assuming that the setting information is stored in the nonvolatile memory 14 of the image forming device 2.

In Step S10, the CPU 11 acquires setting information including each possible setting value of the setting item selected by a user (hereinafter simply referred to as "setting item") from the nonvolatile memory 14 and stores the setting information in the RAM 13. In a case where the setting information is stored in the external device, the CPU 11 may acquire the corresponding setting information from the external device.

In Step S20, the CPU 11 determines whether or not there is at least one piece of the setting information acquired in Step S10. In a case where at least one piece of the acquired setting information exists, the processing proceeds to Step S30.

In Step S30, the CPU 11 determines whether or not setting information including the setting value exists for each possible setting value of the setting item. In a case in which setting information including the setting value exists, as shown in FIG. 4, the setting value selection screen 5, in which the notification batch 31 is associated with each item of the setting list 33 associated with the setting values included in the setting information is displayed on the display unit 22.

"Displaying the notification batch 31 in association with the setting list 33" means that the notification batch 31 is displayed so that the user may recognize to which item of the setting list 33 the notification batch corresponds. In such a display form, the notification batch 31 may be displayed in the setting list 33 in any manner. In the example of the setting value selection screen 5 shown in FIG. 4, the notification batch 31 is superimposed and displayed within the range of each item of the setting list 33. However, the CPU 11 may display a pop-up screen in a case where the user long-presses the setting list 33 and display the notification batch 31 on the displayed pop-up screen.

Moreover, for example, in a case in which a touch panel is not superimposed and attached to the display unit 22 and a selection method in which a user moves a cursor and selects an item of the setting list 33 below the cursor with a selection button is adopted, the CPU 11 may display a pop-up screen at the time when the cursor moves onto the setting list 33 and display the notification batch 31 on the pop-up screen. In this case, the CPU 11 deletes the pop-up screen at the time when the cursor moves away from the setting list 33.

In the notification batch 31, a number of the shortcut buttons 8 associated with the setting information including the setting value displayed in the setting list 33 associated with the notification batch 31 may be displayed. That is, the number of shortcut buttons 8 associated with the item of the setting list 33 may be displayed in the notification batch 31.

The example of the setting value selection screen 5 shown in FIG. 4 illustrates that the numbers of shortcut buttons 8 associated with the items of the setting list 33 displaying setting values of "auto", "full color", "black and white", and "two color" for the setting item of the color mode are 3, 2, 5, and 1, respectively. As a matter of course, instead of the number of the shortcut buttons 8 associated with the item of the setting list 33, the CPU 11 may display, at the notification batch 31 of each item of the setting list 33, a ratio of the number of the shortcut buttons 8 associated with each item of the setting list 33 to the number of the shortcut buttons 8 associated with all pieces of the setting information acquired in Step S10.

Note that the notification batch 31 is not displayed in an item of the setting list 33 (for example, in the setting value selection screen 5 shown in FIG. 4, the item of the setting list 33 displayed as "single color") associated with a setting value not included in any pieces of the setting information acquired in Step S10. However, the CPU 31 may display, in the setting list 33, another icon at the item of the setting list 33 not associated with the setting information including the displayed setting value, having a different shape and color from those of the notification batch 31 of the other items of setting list 33 associated with the setting information including the setting value displayed in the setting list 33. Furthermore, in order to make it clear that there is no corresponding shortcut button 8 for the item of the setting list 33 not associated with the setting information including the displayed setting value, the CPU 11 may display, at the item of the setting list 33 not associated with the shortcut button 8, a notification batch 31 including a numerical value (in this case, "0") indicating the number of corresponding shortcut buttons 8.

In Step S40, the CPU 11 determines whether or not a notification batch 31 of any item of the setting list 33 has been selected by the user. In a case where a notification batch 31 is selected, the processing proceeds to Step S50. The selection of the notification batch 31 means that the display region of the notification batch 31 is selected by the user.

In Step S50, the CPU 11 displays, on the display unit 22, one or more shortcut buttons 8 associated with the item of the setting list 33 including the notification batch 31 selected by the user. That is, the CPU 11 displays a setting information list 34 including the shortcut buttons 8 associated with the item of the setting list 33 selected by the user.

FIG. 7 shows a display example of the setting information list 34. The setting information list 34 shown in FIG. 7 illustrates a display example of the setting information list 34 in a case where the user selects the notification batch 31 of "auto" in the setting list 33 for the setting item of the color mode on the setting value selection screen 5 shown in FIG. 4.

In the setting information list 34, one or more shortcut buttons 8 each associated with the setting information managed by each management ID is displayed together with the setting information.

The CPU 11 may display setting values included in the setting information displayed for the shortcut button 8 of the setting information list 34 separately for each setting item, or may collectively display the setting values of the setting items common to the shortcut buttons 8 included in the same setting information list 34.

In the case of the setting information list 34 shown in FIG. 7, the setting values for the setting items of "copy side," "magnification," and "N up", which are respectively "both sides," "100%," and "no", are common to the setting information associated with the shortcut buttons 8 of which the management ID is represented by "0001", "0003" and "0006". Therefore, the CPU 11 collectively displays these setting values in a frame of a common setting value.

However, since the setting values for the setting items "number of copies" and "paper size" are different between two or more shortcut buttons 8, these setting values are individually displayed for each of the shortcut buttons 8.

In a case where the user selects the "management ID", the "date and time", the "number of times of use", or a title field of any of the individually displayed setting items, the CPU 31 displays the shortcut buttons 8 included in the setting information list 34 in descending or ascending order based on the setting values of the selected setting item. Whether the shortcut buttons 8 are displayed in descending order or in ascending order may be selected by the user.

Note that, for a setting item having a setting value not common to all of the shortcut buttons 8 included in the setting information list 34 but common to plural shortcut buttons 8, the common setting value may be collectively displayed in a common frame as illustrated in FIG. 8.

In Step S60 of FIG. 6, the CPU 11 determines whether or not any one of the shortcut buttons 8 included in the setting information list 34 displayed on the display unit 22 in Step S50 is selected by the user. In a case in which none of the shortcut buttons 8 is selected, the determination processing in Step S60 is repeatedly executed to monitor the selection of the shortcut button 8. On the other hand, in a case in which any one of the shortcut buttons 8 is selected, the processing proceeds to Step S70.

In Step S70, the CPU 11 sets the setting value for each setting item related to the function to be executed by the user to the setting value of the setting information associated with the selected shortcut button 8, thereby updates the setting value for each setting item.

In Step S80, the CPU 11 displays the setting value list screen 4 shown in FIG. 3 on the display unit 22, displays the setting value for each setting item updated in accordance with the setting information corresponding to the shortcut button 8 selected by the user on the display unit 22, and ends the display processing of the setting value selection screen 5 shown in FIG. 6.

In response to this, the user checks whether the setting value for each setting item is a desired setting value on the setting value list screen 4. If there is no problem, the user selects the execution button 4A on the setting value list screen 4 to execute the function. Note that, after updating the setting value for each setting item in Step S70, the CPU 11 may execute the function in accordance with the updated setting value for each setting item without executing Step S80. In this case, the user may omit the operation of selecting the execution button 4A in the setting value list screen 4 to execute of the function.

In a case where it is determined in the determination processing of Step S40 of FIG. 6 that a notification batch 31 is not selected, the processing proceeds to Step S90.

The user may set a setting value only to the setting item, which is a setting target of the setting value, on the setting value selection screen 5 without using the shortcut button 8. Therefore, in Step S90, the CPU 11 determines whether or not any item of the setting list 33 has been selected by the user. Selecting an item of the setting list 33 means that the user selects a region of the item other than the display region of the notification batch 31 in the setting list 33. In this case, the setting value displayed at the item of the setting list 33 selected by the user is obtained.

Therefore, in a case where any item of the setting list 33 is selected, in Step S70, the CPU 11 updates the setting value by setting the setting value displayed at the item of the setting list 33 selected by the user to the setting item, which is the setting target of the setting value in the setting value selection screen 5.

Moreover, in a case where it is determined in the determination processing of Step S20 that there is no setting information acquired in Step S10, the process proceeds to Step S100.

In Step S100, the CPU 11 displays the setting value selection screen 5 in which no notification batch 31 is associated with any item of the setting list 33. In this case, the user would select an item of the setting list 33 and set a setting value to the setting item. Therefore, in Step S110, the CPU 11 determines whether or not any item of the setting list 33 is selected by the user. In a case where none of the items of the setting lists 33 is selected, the determination processing in Step S110 is repeatedly executed to monitor the selection of the setting list 33. On the other hand, in a case where any item of the setting list 33 is selected, in Step S70, the CPU 11 updates the setting value by setting the setting value displayed in the item of the setting list 33 selected by the user to the setting item, which is the setting target of the setting value in the setting value selection screen 5.

Note that, in the display processing of the setting value selection screen 5 shown in FIG. 6, for convenience of description, a flow of the processing in which the user selects either the notification batch 31 or the setting list 33 on the setting value selection screen 5 to set the setting value of the setting item has been described. However, by selecting the return button 32 of the setting value selection screen 5 during the display processing of the setting value selection screen 5, the display processing of the setting value selection screen 5 may be forcibly terminated without setting the setting value to the setting item, and the screen may return to the setting value list screen 4. That is, the user may cancel the display processing of the setting value selection screen 5.

In the display processing of the setting value selection screen 5 shown in FIG. 6, all of the shortcut buttons 8 associated with the setting information including the setting values displayed in the setting list 33 are associated with the setting list 33. However, when there is a setting value of the setting item that has an extremely high ratio of being set (e.g., a setting value that is set to the setting item for 80% or more cases) than the other setting values, the number of shortcut buttons 8 associated with the item of the setting list 33 that displays the setting value also increases in accordance with the setting ratio of the setting value, and it becomes difficult for a user to find a desired shortcut button 8 from the setting information list 34.

Specifically, the setting value of "number of copies" in the copy function is often set to "one copy". Therefore, most of the shortcut buttons 8 associated with the item of the setting list 33 of the setting value selection screen 5 for setting the setting value of "number of copies" as the setting item are concentrated to the item of the setting list 33 in which the setting value is set to "one copy."

Therefore, in the following description, a modification example will be described in which, among the shortcut buttons 8 associated with the setting information acquired in Step S10 of the display processing of the setting value selection screen 5 shown in FIG. 6, only the shortcut button 8 satisfying a predetermined condition is associated with the item of the setting list 33, thereby narrowing down the number of the shortcut buttons 8 displayed when the user selects the notification batch 31 in the setting list 33.

First Modification Example

When executing a desired function from the menu screen 1 of the image forming device 2 shown in FIG. 2, a user may be requested from the image forming device 2 to input a user ID allocated in advance for each user so that only an authorized user is able to execute the function selected by the menu button 3. The user ID input by the user to the image forming device 2 is temporarily stored in the RAM 13, and is saved in the setting information together with the setting value and the like set for each setting item by the user.

Therefore, as an example of the predetermined condition, the CPU 11 may acquire only the setting information including the same user ID as the user ID input by the user to the image forming device 2 from the setting information acquired in Step S10 in the display processing of the setting value selection screen 5 in FIG. 6, and perform the processing subsequent to Step S20.

In this case, in a case where the user selects a notification batch 31 of an item of the setting list 33 on the setting value selection screen 5, among the shortcut buttons 8 associated with the setting list 33 including the notification batch 31 selected by the user, only the shortcut button 8 associated with the setting information set by that user is displayed in the setting information list 34.

Second Modification Example

In Step S10 in the display processing of the setting value selection screen 5 of FIG. 6, if the setting value displayed in the setting list 33 selected by the user is included in the setting information, the setting information is acquired even if the setting value of the setting item other than the setting item for which the user intends to set a setting value from the setting value selection screen 5 is any value.

That is, since the shortcut button 8 associated with the setting information including the setting value different from the setting value set to the other setting items displayed on the setting value list screen 4 is also associated with the setting list 33, the number of the shortcut buttons 8 included in the setting information list 34 increases.

Therefore, as an example of the predetermined condition, the CPU 11 may acquire only the setting information including all setting values of the other setting items displayed on the setting value list screen 4 from the setting information acquired in Step S10 in the display processing of the setting value selection screen 5 in FIG. 6, and perform the processing subsequent to Step S20.

In this case, when the user selects a notification batch 31 displayed in the setting list 33 of the setting value selection screen 5, among the shortcut buttons 8 associated with the item of the setting list 33 including the notification batch 31 selected by the user, only the shortcut button 8 associated with the setting information including all of the setting values set for the setting items other than the setting item for which the user intents to set a setting value from the setting value selection screen 5, is displayed in the setting information list 34.

Third Modification Example

The setting values set in the other setting items in the second modification example may include a setting value that remains as the initial value, or a setting value intentionally set by the user from the setting value selection screen 5. While the setting value intentionally set by the user from the setting value selection screen 5 is a setting value set on the basis of a necessary condition such as "this setting item needs to be this setting value", the setting value that remains as the initial value may be a setting value that the user does not place importance on as much as the intentionally set setting value.

Therefore, as an example of the predetermined condition, the CPU 11 may acquire only the setting information including all the initial values set to values different from the initial values among the setting values for each setting item displayed on the setting value list screen 4, from the setting information acquired in Step S10 in the display processing of the setting value selection screen 5 in FIG. 6, and perform the processing subsequent to Step S20.

In this case, when a user selects a notification batch 31 displayed in the setting list 33 on the setting value selection screen 5, among the shortcut buttons 8 associated with the setting list 33 including the notification batch 31 selected by the user, only the shortcut button 8 associated with the setting information including all the setting values whose settings have been changed from the initial values set in advance for the respective setting items is displayed in the setting information list 34.

For example, suppose that the setting information list 34 of FIG. 7 is a setting information list 34 displayed when a user selects a notification batch 31 displayed in the item of the setting list 33 with the setting value of "auto" for the setting item of the "color mode", without applying the processing of the third modification example.

In contrast, in a case where the processing of the third modification example is applied, and the user selects the notification batch 31 displayed in the item of the setting list 33 with the setting value of "auto" for the setting item of "color mode" after changing the setting value for the setting item of "paper size" from the initial value to "A4", a setting information list 34 as shown in FIG. 9 is displayed.

That is, as a result of applying the processing of the third modification example, the setting information list 34 shown in FIG. 9 does not include the shortcut button 8 whose "paper size" is set to "B5" in the setting information list 34, which is illustrated in FIG. 7.

Fourth Modification Example

In Step S10 in the display processing of the setting value selection screen 5 of FIG. 6, if the setting value displayed in the setting list 33 and selected by the user is included in the setting information, the setting information is acquired regardless of the type of the setting item.

For example, when a setting item of "N-up" is selected, a setting value of "no" and a setting value of "do" are displayed in the setting list 33 on the setting value selection screen 5, and notification batches 31 are displayed. Here, since the setting value of "N-up" is often set to "no" rather than "do", when the notification batch 31 notifying that the setting information in which the setting value of "N-up" is set to "no" exists is selected, the number of the shortcut buttons 8 displayed in the setting information list 34 increases.

Therefore, as an example of the predetermined condition, the CPU 11 may perform the processing subsequent to Step S20 only for a predetermined setting value in the setting information acquired in Step S10 in the display processing of the setting value selection screen 5 in FIG. 6. For example, the processing subsequent to Step S20 may be performed only in a case where "do" is selected as the setting value of "N-up". Alternatively, the processing subsequent to Step S20 may be performed only for a predetermined setting item among the setting items selected by the user. For example, the processing subsequent to Step S20 may be performed only for the setting items other than "N-up".

Note that which setting values or setting items are to be display targets of the notification batch 31 may be set in advance by the manufacturer of the image forming device 2 at the time of factory shipment, or may be set by the user operating the input unit 21.

Figure 10:
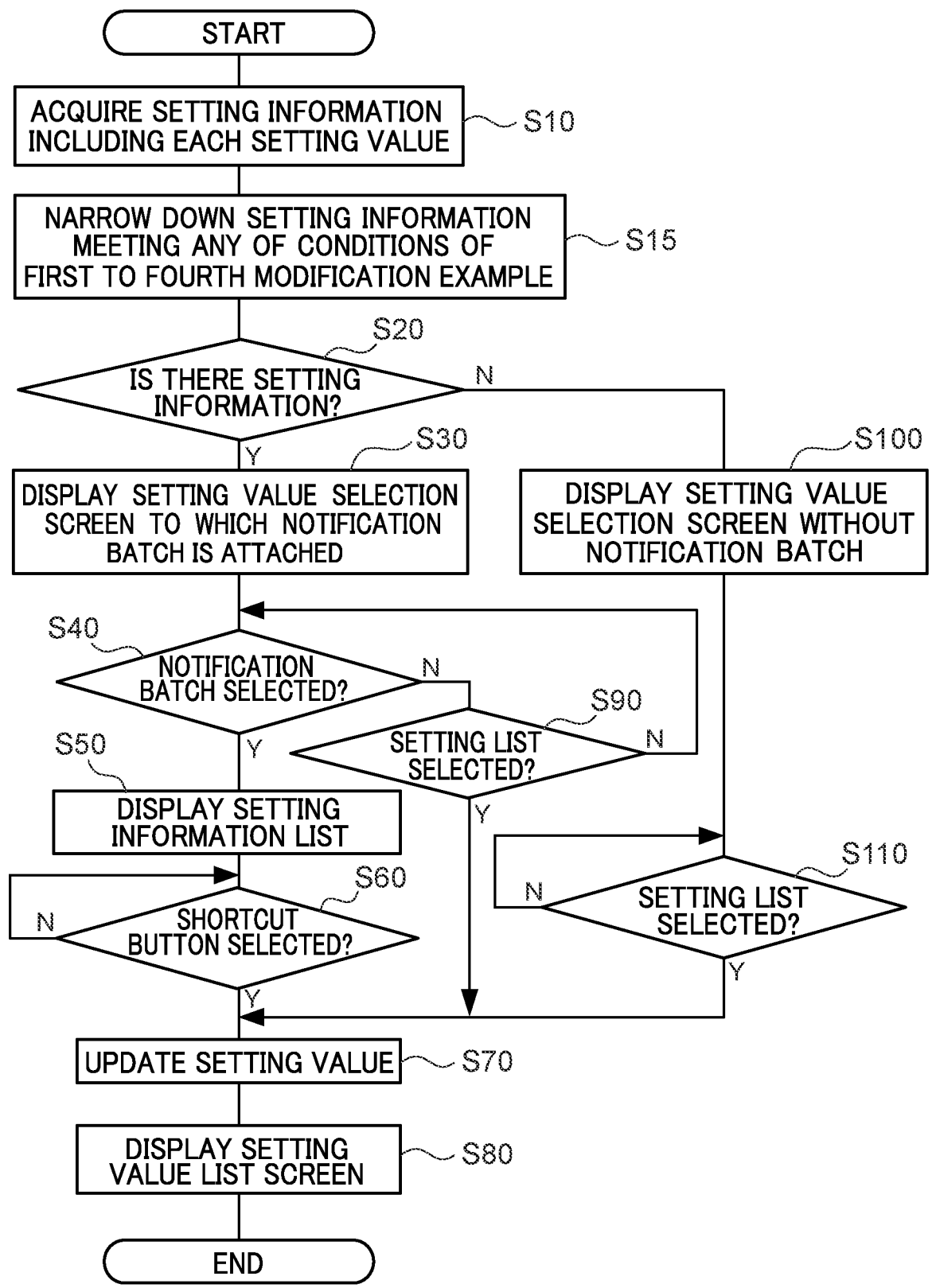
FIG. 10 is a flowchart showing a modification example of display processing of the setting value selection screen.

FIG. 10 is a flowchart showing an example of a flow in the display processing of the setting value selection screen 5 to which any one of the first modification example to the fourth modification example is applied. The display processing of the setting value selection screen 5 shown in FIG. 10 is different from the display processing of the setting value selection screen 5 shown in FIG. 6 in that Step S15 is added, and the other processing is the same as the display processing of the setting value selection screen 5 shown in FIG. 6.

According to Step S15 of executing the processing according to any one of the first modification example to the fourth modification example, among the setting information acquired in Step S10, only the shortcut button 8 corresponding to the setting information that meets the predetermined condition in each of the modification examples is associated with the setting list 33. Note that the CPU 11 may execute, in Step S15, processing in which at least two of the first modification example to the fourth modification example are combined.

As described above, according to the image forming device 2 of the first embodiment, even without a user setting any setting value to any setting item, and only by displaying the setting value selection screen 5 for the setting item to which the setting value is to be set, presence or absence of the shortcut button 8 corresponding to the setting information including the setting value displayed in the setting list 33 and the number of the shortcut buttons 8 associated with each items of the setting list 33 are displayed in the setting list 33 corresponding to each setting value of the setting value selection screen 5.

Second Embodiment

In the first embodiment, execution of the copy function by a user is used as an example, and the notification batch 31 for notifying the presence of the shortcut button 8 corresponding to the setting information including each setting value is displayed. However, the functions of the image forming device 2 may include plural types of transmission functions for transmitting information through a communication line (not shown).

For example, as shown in the menu screen 1 of FIG. 2, the image forming device 2 according to the present embodiment includes the menu button 3 for executing different types of transmission functions such as a mail function, a facsimile function, and an FTP function.

In such a transmission function, it is necessary to set a setting value representing a transmission destination of information. An address book 35 is prepared so that every time a user transmits information, for example, in a case of a facsimile function, it is not necessary to perform an operation of inputting all digits of the facsimile number of the transmission destination.

In the address book 35, an address that is information for a user to identify who is a transmission destination of the information, and a transmission destination identifier that is an identifier uniquely determined in advance for the transmission destination for each function for identifying the transmission destination of the information and that is information used by the CPU 11 to execute the function selected by the user, are associated with each other, and a list of addresses associated with the transmission destination identifier is displayed. For easy understanding by the user, for example, a company name or a name of a person is set as the address. As the transmission destination identifier, a mail address is set for the mail function, a facsimile number is set for the facsimile function, and an IP address is set for the FTP function.

FIG. 11 shows an example of the address book 35. In the address book 35, the registered addresses are displayed on the setting list 33 separately for each address. In the case of the address book 35 shown in FIG. 11, users A to E are addresses.

A transmission destination identifier set to the address displayed in the setting list 33 is also displayed in the setting list 33 in which the address is displayed. In the case of the address book 35 shown in FIG. 11, an IP address, a mail address, and a facsimile number are displayed for the user A, a mail address is displayed for the user B, and a mail address and a facsimile number are displayed for the user C. Furthermore, an IP address and a facsimile number are displayed for the user D, and a facsimile number is displayed for the user E.

That is, the user A is registered as a transmission destination of the FTP function, the mail function, and the facsimile function, the user B is registered as a transmission destination of the mail function, and the user C is registered in the address book 35 as a transmission destination of the mail function and the facsimile function. In addition, the user D is registered as a transmission destination of the FTP function and the facsimile function, and the user E is registered in the address book 35 as a transmission destination of the facsimile function.

Therefore, every time information is transmitted by any of the transmission functions, the user may set the transmission destination identifier by selecting an item of the setting list 33 for displaying a desired address from the address book 35 without performing an operation of inputting all characters constituting the transmission destination identifier one by one.

Similar to the setting list 33 of the setting value selection screen 5 described in the first embodiment, each item of the setting lists 33 in the address book 35 is associated with setting information including each transmission destination identifier of an address displayed in the setting list 33 as a setting value of a setting item representing a transmission destination of information, and a notification batch 31 is displayed in a case where setting information corresponding to the setting list 33 exists.

Hereinafter, display processing for displaying such an address book 35 will be described.

Figure 12:
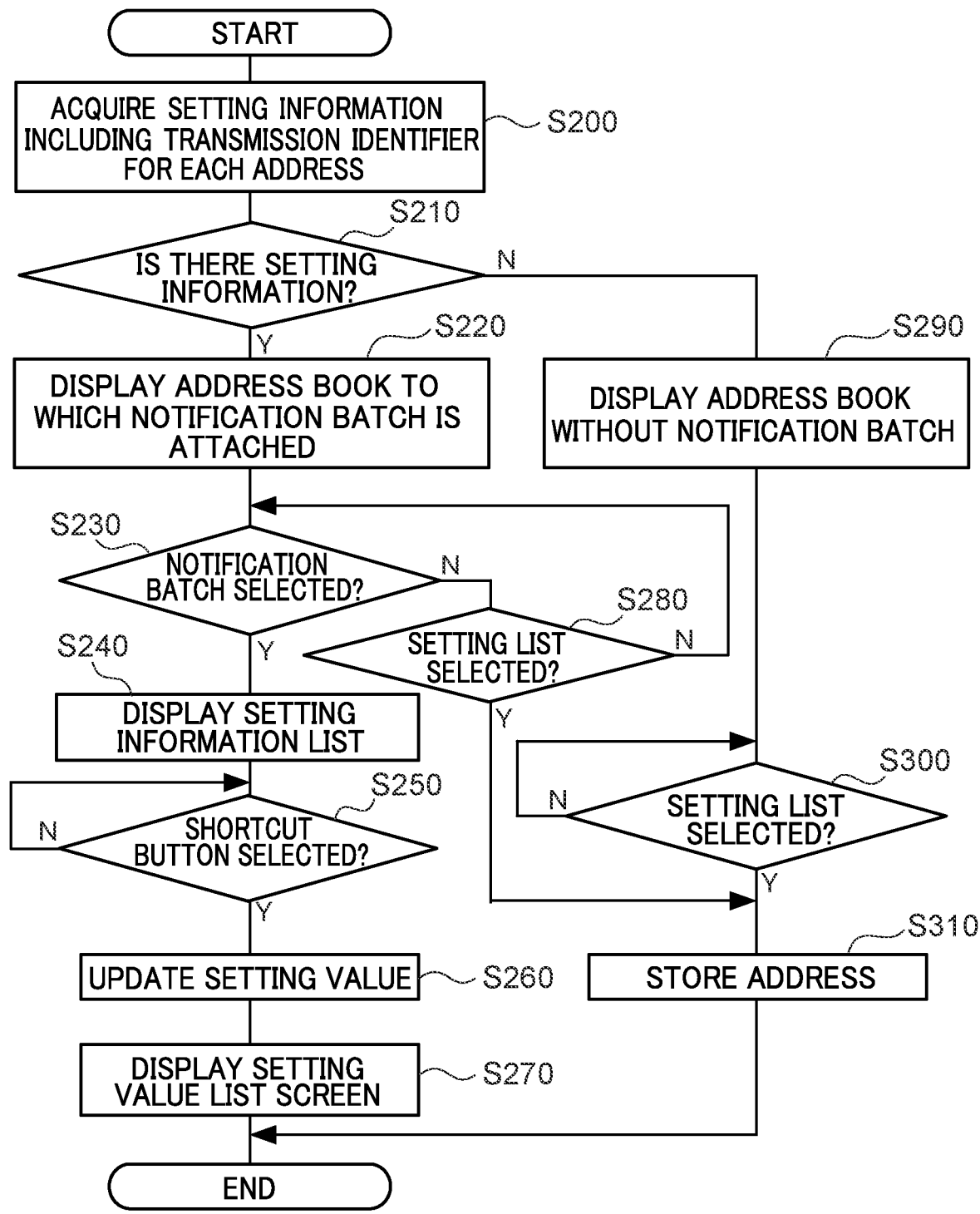
FIG. 12 is a flowchart showing an example of display processing of the address book.

FIG. 12 is a flowchart showing an example of display processing of the address book 35 executed by the CPU 11 of the image forming device 2 in a case where a notification of a display instruction is accepted as a result of a user selecting an address book icon on the menu screen 1 shown in FIG. 2.

The information processing program defining the display processing of the address book 35 is stored in advance in the ROM 12 of the image forming device 2, for example, similarly to in the display processing of the setting value selection screen 5 described in the first embodiment. The CPU 11 of the image forming device 2 reads an information processing program stored in the ROM 12 and executes the display processing of the address book 35.

First, in Step S200, the CPU 11 acquires, from the nonvolatile memory 14 for each destination, setting information including each transmission destination identifier of an address registered in the address book 35 as a setting value of a setting item representing a transmission destination of information, and stores the setting information in the RAM 13.

In Step S210, the CPU 11 determines whether or not there is at least one piece of the setting information acquired in Step S200. In a case where at least one piece of the acquired setting information exists, the processing proceeds to Step S220.

In Step S220, the CPU 11 determines whether or not setting information including a transmission destination identifier exists for each address, and in a case where the setting information including the transmission destination identifier exists, as shown in FIG. 11, the address book 35, in which the notification batch 31 is associated with each item of the setting lists 33 in which an address associated with the transmission destination identifier included in the setting information is displayed, is displayed on the display unit 22.

Similar to the display processing of the setting value selection screen 5 shown in FIG. 6 described in the first embodiment, a number of pieces of setting information including each transmission destination identifier of the address displayed in the setting list 33 associated with the notification batch 31 may be displayed in the notification batch 31. That is, the number of shortcut buttons 8 associated with the setting information including the transmission destination identifier of the address displayed in the setting list 33 associated with the notification batch 31 may be displayed in the notification batch 31. The example of the address book 35 shown in FIG. 11 illustrates that the number of shortcut buttons 8 associated with the setting information including the transmission destination identifier of each address represented by the user A, the user B, and the user D is 4, 1, and 3, respectively.

Note that the various display examples related to the display of the notification batch 31 described in Step S30 of the display processing of the setting value selection screen 5 shown in FIG. 6 may be applied to the display of the notification batch 31 in Step S220.

In Step S230, the CPU 11 determines whether or not any notification batch 31 of the setting list 33 has been selected by the user. In a case where a notification batch 31 is selected, the processing proceeds to Step S240.

In Step S240, the CPU 11 displays, on the display unit 22, the setting information list 34 including the shortcut button 8 associated with the setting information including each transmission destination identifier of the address displayed in the item of the setting list 33 associated with the notification batch 31 selected by the user, that is, the shortcut button 8 associated with the address selected by the user.

The CPU 11 may collectively display each of the shortcut buttons 8 associated with the address in one setting information list 34 regardless of the type of the transmission function associated with the address. However, it is preferable to collectively display the shortcut buttons 8 in the setting information list 34 for each type of the transmission function so that the user may easily find a shortcut button 8 for executing a desired transmission function. FIG. 13 shows an example of the setting information list 34 that collectively displays the shortcut buttons 8 for each type of transmission function. Note that various display examples regarding the setting information list 34 described in Step S50 of the display processing of the setting value selection screen 5 shown in FIG. 6 may be applied to the display of the setting information list 34 in a case where the notification batch 31 of the address book 35 is selected.

In Step S250 of FIG. 12, the CPU 11 determines whether or not any shortcut button 8 included in the setting information list 34 displayed on the display unit 22 in Step S240 is selected by the user. In a case in which none of the shortcut buttons 8 is selected, the determination processing in Step S250 is repeatedly executed to monitor the selection of the shortcut button 8. On the other hand, in a case in which any one of the shortcut buttons 8 is selected, the processing proceeds to Step S260.

In Step S260, the CPU 11 sets the setting value for each setting item related to the function executed by the shortcut button 8 selected by the user to the setting value included in the setting information associated with the selected shortcut button 8, and updates the setting value for each setting item.

In Step S270, the CPU 11 displays the setting value list screen 4 shown in FIG. 3 on the display unit 22, displays the setting value for each setting item updated in accordance with the setting information corresponding to the shortcut button 8 selected by the user, and ends the display processing of the address book 35 shown in FIG. 12. Note that, after updating the setting value for each setting item in Step S260, the CPU 11 may execute the function in accordance with the updated setting value for each setting item without executing Step S270.

In a case where it is determined that the notification batch 31 is not selected in the determination processing of Step S230 of FIG. 12, the processing proceeds to Step S280.

The user may not select a notification batch 31, and may select an item of the setting list 33 in which the address is displayed in order to set only the address of the transmission destination. In a case where the user selects an item of the setting list 33, the address displayed in the selected item of the setting list 33 is obtained.

Therefore, in Step S280, the CPU 11 determines whether or not any item of the setting list 33 has been selected by the user. In a case where any one item of the setting lists 33 is selected, the processing proceeds to Step S310, and in Step S310, the CPU 11 acquires the address displayed in the selected item of the setting list 33, stores the address in the RAM 13, displays the menu screen 1 shown in FIG. 2 on the display unit 22, and ends the display processing of the address book 35 shown in FIG. 12.

Moreover, in a case where it is determined in the determination processing of Step S210 that no setting information is acquired in Step S200, the processing proceeds to Step S290.

In Step S290, the CPU 11 displays the address book 35 in which a notification batch 31 is not associated with any item of the setting list 33. In this case, the user would select an item of the setting list 33 to set the address. Therefore, in Step S300, the CPU 11 determines whether or not any item of the setting list 33 is selected by the user. In a case where no item of the setting lists 33 is selected, the determination processing in Step S300 is repeatedly executed to monitor the selection of the setting list 33. Meanwhile, in a case where any one item of the setting lists 33 is selected, the processing proceeds to Step S310, and in Step S310, the CPU 11 acquires the address displayed in the selected item of the setting list 33, stores the address in the RAM 13, displays the menu screen 1 shown in FIG. 2 on the display unit 22, and ends the display processing of the address book 35 shown in FIG. 12.

For example, in a case where the user selects the menu button 3 corresponding to any transmission function from the menu screen 1 shown in FIG. 2, the CPU 11 may set the transmission destination identifier corresponding to the selected transmission function among the transmission destination identifiers of the addresses stored in the RAM 13 in Step S310 as the setting value of the setting item representing the transmission destination of the information, and display the setting value list screen 4 shown in FIG. 3 on the display unit 22. The user may check the setting value of each setting item in the transmission function displayed on the setting value list screen 4, and selects the execution button 4A on the setting value list screen 4 to execute the transmission function.

In this case, when displaying the setting value list screen 4 on the display unit 22, the CPU 11 may display only the menu buttons 3 corresponding to the transmission function on the menu screen 1. For example in the menu screen 1 shown in FIG. 2, the menu buttons 3 corresponding to the copy function, the image forming function, and the scanner function other than the transmission function is not displayed, and only the menu buttons 3 corresponding to the FTP function, the mail function, and the facsimile function are displayed on the menu screen 1. That is, it is easier for a user to select a menu button 3 corresponding to the desired transmission function than a case where the menu buttons 3 corresponding to all of the functions possessed by the image forming device 2 are displayed on the menu screen 1.

The transmission destination identifier in such a transmission function may be changed due to circumstances. Since the transmission destination identifier included in the setting information is the transmission destination identifier associated with the address at the time of generating the setting information, even if the addresses are the same, the transmission destination identifier included in the setting information may be different from the transmission destination identifier (referred to as a "new transmission destination identifier") currently associated with the address.

Therefore, the CPU 11 compares the transmission destination identifier associated with the address with the transmission destination identifier included in the setting information, and in a case in which the transmission destination identifier included in the setting information is different from the transmission destination identifier of the address, a notification information notifying that the transmission destination identifier has been changed is displayed together with the setting information associated with the shortcut button 8.

FIG. 14 shows a display example in which the notification information is displayed together with the setting information associated with the shortcut button 8 of the mail function.

In the mail function setting information list 34 shown in FIG. 14, two item fields of "mail address before change" and "use current mail address" are added to the mail function setting information list 34 illustrated in FIG. 13.

The item fields of "mail address before change" and "use current mail address" are item fields displayed in a case where there is setting information including a transmission destination identifier different from the transmission destination identifier of the address displayed in the setting list 33 selected by the user in the setting information associated with the shortcut button 8 included in the setting information list 34. In the item field of the "mail address before change" in the shortcut button 8 associated with the setting information including a different transmission destination identifier, the CPU 11 displays an old transmission destination identifier (in this case, a mail address) in order to notify a user that the transmission destination identifier included in the setting information is the old transmission destination identifier. Note that, in the shortcut button 8 associated with the setting information including the new transmission destination identifier, the CPU 11 displays "–" in the item field of the "mail address before change".

Furthermore, the CPU 11 displays a check box in the item field of "use current mail address" in the shortcut button 8 associated with the setting information including the old transmission destination identifier. In a case where the user selects the check box and sets a check mark in the check box, the CPU 11 sets a setting value of a setting item representing the new transmission destination identifier, rather than the old transmission destination identifier.

In a case where the shortcut button 8 is selected without setting a check mark in the check box, the CPU 11 sets the old transmission destination identifier to the setting value of the setting item representing the transmission destination of the information. Such a setting is useful in a case where it is desired to send information using the old transmission destination identifier due to, for example, a failure occurring in a communication facility utilized by the new transmission destination identifier.

Note that, in the shortcut button 8 associated with the setting information including the new transmission destination identifier, the CPU 11 displays "–" instead of a check box in the item field of "use current mail address".

As described above, the CPU 11 may provide, in the setting information list 34 that is displayed when a notification batch 31 in the address book 35 is selected, notification information including an option for a user to select which one of the old transmission destination identifier or the new transmission destination identifier is used to execute the transmission function associated with the shortcut button 8.

Moreover, as an option of selecting the transmission destination identifier, for example, in a case where plural transmission destination identifiers such as a transmission destination identifier addressed to home and a transmission destination identifier addressed to a workplace are associated with the address, options of selecting which transmission destination identifier is used by the user to execute the transmission function may be included in the notification information to be provided. The user selects at least one transmission destination identifier from the options to select the transmission destination of the information.

Although one aspect of the information processing device has been described above using each of the embodiments, the disclosed modes of the information processing device are examples, and the mode of the information processing device is not limited to the scope described in each of the embodiments. Various changes or improvements may be made to each of the embodiments without departing from the gist of the present disclosure, and a mode in which the changes or improvements are made is also included in the technical scope of the disclosure. For example, the order of the display processing shown in FIGS. 6, 10 and 12 may be changed without departing from the gist of the disclosure.

Moreover, in each of the above embodiments, as an example, a mode in which the display processing is realized by software has been described. However, processing equivalent to the flowcharts shown in FIGS. 6, 10 and 12 may be performed by hardware. In this case, the processing speed may be increased as compared with a case where the display processing is realized by software.

In the embodiments, the processor refers to a processor in a broad sense and includes, for example, a general-purpose processor (e.g., the CPU 11) or a dedicated processor (e.g., GPU: Graphics Processing Unit, ASIC: Application Specific Integrated Circuit, FPGA: Field Programmable Gate Array, Programmable Logic Device, and the like).

In addition, the operation of the processor in the embodiments may be performed not only by one processor but also by plural processors existing at physically separated locations in cooperation. Moreover, the order of each operation of the processor is not limited to the order described in the embodiments, and may be changed as appropriate.

In each of the embodiments, an example in which the information processing program is stored in the ROM 12 has been described. However, the storage location of the information processing program is not limited to the ROM 12. The information processing program of the disclosure may also be provided in a form recorded in a storage medium readable by the computer 10. For example, the information processing program may be provided in a form of being recorded on an optical disk such as a compact disk read only memory (CD-ROM) and a digital versatile disk read only memory (DVD-ROM). Moreover, the information processing program may be provided in a form of being recorded in a portable semiconductor memory such as a universal serial bus (USB) memory and a memory card. The ROM 12, the nonvolatile memory 14, the CD-ROM, the DVD-ROM, the USB and the memory card are examples of a non-transitory storage medium.

Furthermore, the image forming device 2, which is an example of the information processing device, may download an information processing program from an external device connected to a communication line (not shown) via the communication unit 20, and store the downloaded information processing program in the storage device. In this case, the CPU 11 of the image forming device 2 reads an information processing program downloaded from an external device and executes the display processing.

The disclosure of Japanese Patent Application No. 2021-009835 filed on Jan. 25, 2021 is incorporated herein by reference in its entirety. All documents, patent applications and technical standards described in this specification are incorporated herein by reference to the same extent as if each document, patent application and technical standard were specifically and individually indicated to be incorporated by reference.

The invention claimed is:

1. An information processing device comprising:
a processor that is configured to:
display, on a display device, a first operation element for allowing a user to select a function to be executed, and a setting screen including each setting item that defines an operation of the function associated with the first operation element selected by the user, and
display, for each setting list and in association with the setting list, information indicating that a second operation element including each possible setting value of the setting item, associated with each setting list displayed in a case in which any setting item included in the setting screen is selected, exists among second operation elements associated with setting information in which a setting value of each setting item set through the setting screen is stored for each setting item, the second operation element executing a function in accordance with the associated setting information when the operation element is selected,
wherein the processor is configured to further associate only the second operation element that meets a predetermined condition with the setting list among the second operation elements including the setting value associated with the setting list, and displays, for each setting list, information indicating that the second operation element associated with the setting list exists, and wherein the processor is configured to associate, with the setting list, the second operation element associated with the setting information including all setting values of the setting items other than the setting item selected from the setting screen by the user, set for the function associated with the first operation element to be executed by the user, among the second operation elements including the setting values associated with the setting list.

2. The information processing device according to claim 1, wherein the processor is configured to display, for each setting list and in association with the setting list, a number of the second operation elements including each possible setting value of the setting item, as the information indicating that the second operation element including each possible setting value of the setting item exist.

3. The information processing device according to claim 1, wherein
the processor is configured to associate, with the setting list, the second operation element associated with the setting information set by the user who intends to execute the function associated with the first operation element, among the second operation elements including the setting value associated with the setting list.

4. The information processing device according to claim 1, wherein
the processor is configured to associate, with the setting list, the second operation element associated with the setting information including all setting values of which settings have been changed from initial values set in advance for the respective setting items in the function associated with the first operation element to be executed by the user, among the second operation elements including the setting values associated with the setting list.

5. The information processing device according to claim 1, wherein
the processor is configured to, in a case in which a display region showing the information indicating that the second operation element displayed in association with the setting list exists, is selected, display each of the second operation elements associated with the setting list together with the setting information associated with each of the second operation elements.

6. The information processing device according to claim 5, wherein
the processor is configured to collectively display the setting values of the setting items common to respective pieces of the setting information of the second operation elements, among the setting information displayed together with the second operation elements, as setting values common to the second operation elements, and individually display the setting values of the setting items different for two or more of the second operation elements for each of the second operation elements.

7. The information processing device according to claim 1, wherein the second operation elements is at least one of a history operation element associated with the setting information when an instruction from a user to execute the function associated with the first operation element is accepted, or a save operation element created as the setting information repeatedly used by the user.

8. An information processing device comprising:
a processor that is configured to:
display, on a display device, a first operation element for allowing a user to select a function to be executed, and a setting screen including each setting item that defines an operation of the function associated with the first operation element selected by the user, and
display, for each setting list and in association with the setting list, information indicating that a second operation element including each possible setting value of the setting item, associated with each setting list displayed in a case in which any setting item included in the setting screen is selected, exists among second operation elements associated with setting information in which a setting value of each setting item set through the setting screen is stored for each setting item, the second operation element executing a function in accordance with the associated setting information when the operation element is selected, wherein
the processor is configured to, in a case in which the function selected by the first operation element includes a plurality of types of transmission functions for transmitting information through a communication line, accept an address book display instruction for displaying a list of addresses associated with at least one transmission destination identifier used in any of the transmission functions, and
display, for each address in the address book, information indicating that the second operation element associated with the setting information including, as a setting value, a transmission destination identifier associated with the address exists in association with the address.

9. The information processing device according to claim 8, wherein
the processor is configured to, in a case in which a display region showing information indicating that the second operation element displayed in association with the address exists, is selected, display each of the second operation elements associated with the address together with the setting information associated with each of the second operation elements.

10. The information processing device according to claim 9, wherein
the processor is configured to collectively display the second operation elements for each type of the transmission function.

11. The information processing device according to claim 9, wherein
the processor is configured to, in a case in which the transmission destination identifier included in the setting information is a transmission destination identifier previously associated with the address, display, together with the setting information, notification information notifying that the transmission destination identifier has been changed.

12. The information processing device according to claim 11, wherein
the processor is configured to display, together with the setting information, an option for selecting which transmission destination identifier is used to execute the transmission function associated with the second operation element.

13. A non-transitory storage medium storing a program causing a computer to execute information processing, the information processing comprising:
displaying, on a display device, a first operation element for allowing a user to select a function to be executed, and a setting screen including each setting item that defines an operation of a function associated with the first operation element selected by the user, and displaying, for each setting list and in association with the setting list, information indicating that a second operation element including each possible setting value of the setting item, associated with each setting list displayed in a case in which any setting item included in the setting screen is selected, exists among second operation elements associated with setting information in which a setting value of the setting item set through the setting screen is stored for each setting item, the second operation elements executing a function in accordance with the associated setting information when the operation element is selected, associating only the second operation element that meets a predetermined condition with the setting list among the second operation elements including the setting value associated with the setting list, and displaying, for each setting list, information indicating that the second operation element associated with the setting list exists, and associating, with the setting list, the second operation element associated with the setting information including all setting values of the setting items other than the setting item selected from the setting screen by the user, set for the function associated with the first operation element to be executed by the user, among the second operation elements including the setting values associated with the setting list.

* * * * *